US008996974B2

(12) United States Patent
Tan et al.

(10) Patent No.: US 8,996,974 B2
(45) Date of Patent: Mar. 31, 2015

(54) ENHANCING VIDEO PRESENTATION SYSTEMS

(75) Inventors: Kar-Han Tan, Sunnyvale, CA (US); Daniel G. Gelb, Redwood City, CA (US); Ian N. Robinson, Pebble Beach, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 494 days.

(21) Appl. No.: 12/897,393

(22) Filed: Oct. 4, 2010

(65) Prior Publication Data
US 2012/0081611 A1 Apr. 5, 2012

(51) Int. Cl.
H04N 9/74 (2006.01)
H04N 7/14 (2006.01)
G09B 5/02 (2006.01)
G09B 5/06 (2006.01)

(52) U.S. Cl.
CPC .............. H04N 7/144 (2013.01); G09B 5/02 (2013.01); G09B 5/06 (2013.01)
USPC ........................................................ 715/204

(58) Field of Classification Search
CPC ....................................................... G09B 5/06
USPC ....................................................... 715/204
See application file for complete search history.

(56) References Cited

U.S. PATENT DOCUMENTS

| 4,859,050 A | 8/1989 | Borah et al. |
| 5,874,959 A | 2/1999 | Rowe |
| 6,353,450 B1* | 3/2002 | DeLeeuw ....................... 715/768 |
| 6,481,851 B1* | 11/2002 | McNelley et al. ............... 353/28 |
| 2004/0205477 A1* | 10/2004 | Lin .............................. 715/500.1 |
| 2005/0151850 A1* | 7/2005 | Ahn et al. .................. 348/207.99 |
| 2008/0184124 A1* | 7/2008 | Agarwal et al. ............... 715/733 |
| 2009/0271821 A1 | 10/2009 | Zalewski |
| 2009/0327896 A1 | 12/2009 | Pall et al. |

OTHER PUBLICATIONS

He, Li-wei, Zicheng Liu, and Zhengyou Zhang. "Why take notes? Use the whiteboard capture system." Acoustics, Speech, and Signal Processing, 2003. Proceedings. (ICASSP'03). 2003 IEEE International Conference on. vol. 5. IEEE, 2003.
Yoshino, Akinori, Hiroshi Mitsumata, and Kenji Miyamoto. "Stepping-in Presentation.".
Zhang, Cha, et al. "An automated end-to-end lecture capture and broadcasting system." ACM Transactions on Multimedia Computing, Communications, and Applications (TOMCCAP) 4.1 (2008): 6.
Zhu, Zhigang, Chad McKittrick, and Weihong Li. "Virtualized classroom-automated production, media integration and user-customized presentation." Computer Vision and Pattern Recognition Workshop, 2004. CVPRW'04. Conference on. IEEE, 2004.

* cited by examiner

*Primary Examiner* — Laurie Ries
*Assistant Examiner* — Zaida I Marrero
(74) *Attorney, Agent, or Firm* — Wagner Blecher, LLP

(57) ABSTRACT

A video system comprises a shared media accessor configured to access shared media. The shared media is configured to be displayed on a first display screen and a second display screen. A video accessor configured to access images from a first camera. A field of view of the first camera is oriented such that the first camera can capture the images comprising non-verbal communication of a user associated with the shared media. A video compositor configured to composite the images captured by the first camera and said shared media. The composited images are configured to be displayed on the second display screen.

7 Claims, 9 Drawing Sheets

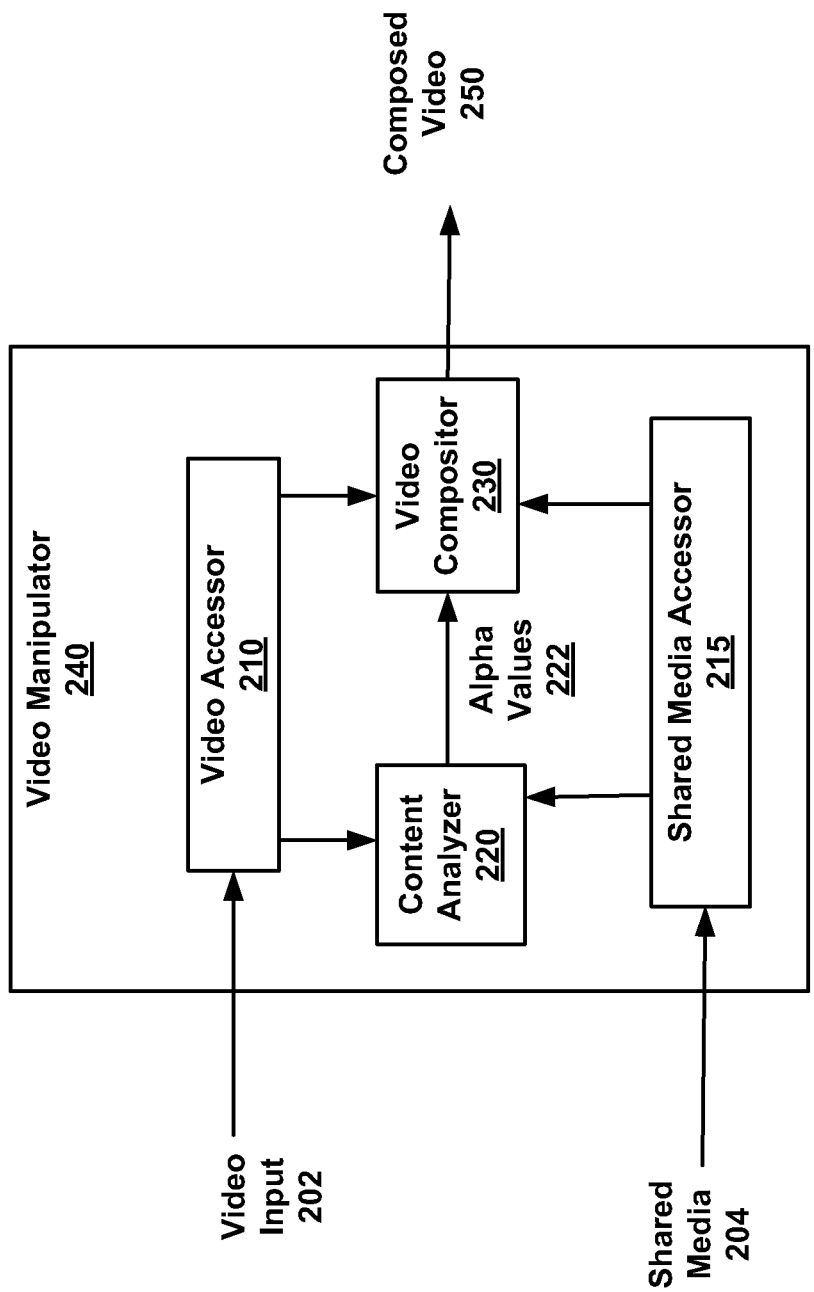

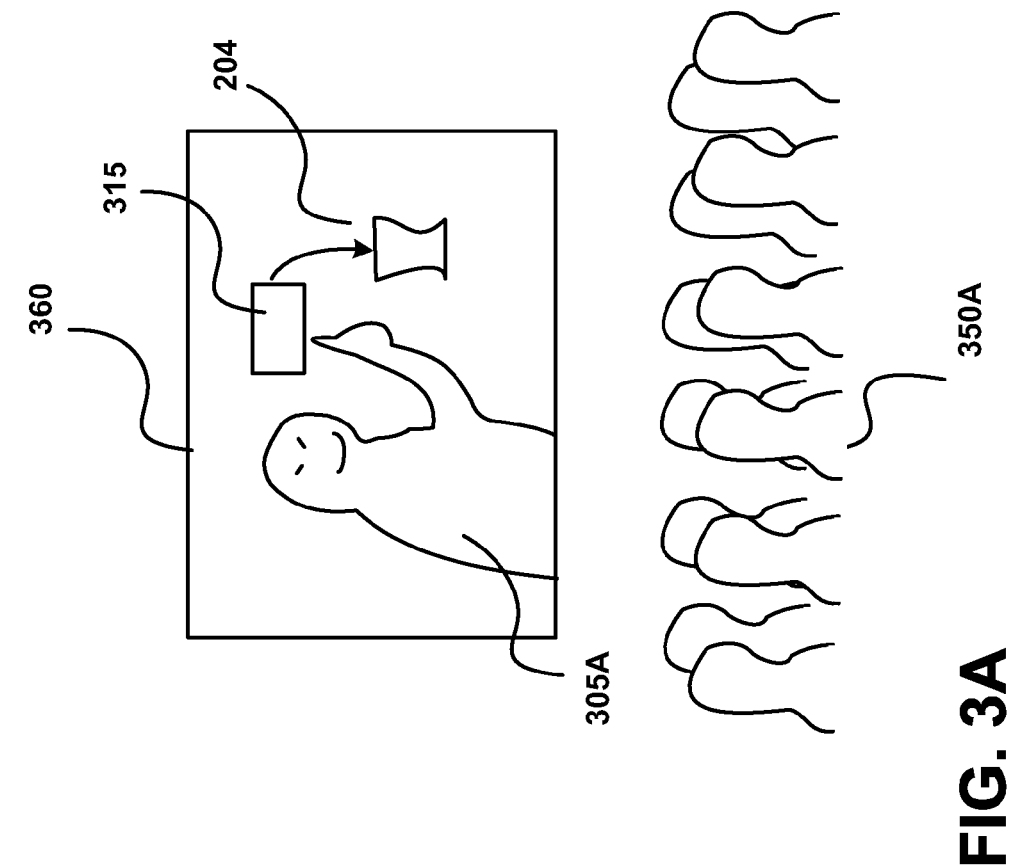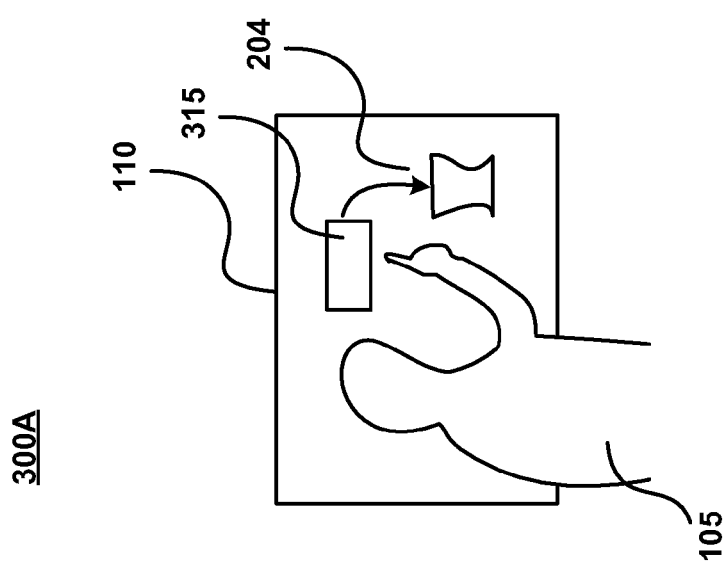
FIG. 3A

ENHANCING VIDEO PRESENTATION SYSTEMS

BACKGROUND

Typically, in computer driven presentation systems, the presenter is limited to using audio and a cursor to convey ideas. An example of such a system is the ubiquitous computer-projector presentation system. In such a system, the display screen is very large and placed in a location so that it is clearly visible from all corners of the room. As a result, it impossible for a presenter to walk up to the display screen and interact with gestures, gaze, and other forms of paralanguage.

Moreover, it is difficult for the audience to know what part of the slide the presenter is looking at when his/her back is turned to the audience while interacting with the slide material. Also, the presenter is unable to see the audience when his/her back is turned to the audience.

In some instances, video captures the presenter, slides and audience. Accordingly, the factors mentioned above, make it very difficult for a user viewing either a live feed or a recording to grasp interaction between all the components and participants of the presentation.

BRIEF DESCRIPTION OF THE DRAWINGS

FIGS. 1 and 3A-F illustrate examples of video presentation systems, in accordance to embodiments of the present invention.

FIG. 2 illustrates a video manipulator, in accordance to an embodiment of the present invention.

The drawings referred to in this description should be understood as not being drawn to scale except if specifically noted.

DESCRIPTION OF EMBODIMENTS

Reference will now be made in detail to embodiments of the present technology, examples of which are illustrated in the accompanying drawings. While the technology will be described in conjunction with various embodiment(s), it will be understood that they are not intended to limit the present technology to these embodiments. On the contrary, the present technology is intended to cover alternatives, modifications and equivalents, which may be included within the spirit and scope of the various embodiments as defined by the appended claims.

Furthermore, in the following description of embodiments, numerous specific details are set forth in order to provide a thorough understanding of the present technology. However, the present technology may be practiced without these specific details. In other instances, well known methods, procedures, components, and circuits have not been described in detail as not to unnecessarily obscure aspects of the present embodiments.

Embodiments of the present invention are directed to video presentation systems. Video presentation systems attempt to recreate the best aspects of actual face-to-face communications with respect to presenting information to an audience. It should be appreciated that a video presentation system includes: a camera disposed at any location that is capable of capturing images and/or audio (e.g. images/audio of a user and/or associated objects) to be transmitted to a corresponding display screen for viewing by an audience.

Specific examples will follow in which video presentation systems include a camera that captures images through a display screen. It will be understood that other video presentation systems can include cameras at any location. However, for the purposes of brevity and clarity, examples of video presentation systems will be used that capture images through a display screen.

Similarly, specific examples will follow in which video presentation systems include a projector that projects images onto a back side of a display screen. It will be understood that other video presentation systems can include a projector on the front side (e.g., same side as the user). Moreover, video presentation systems may not include a projector and images are displayed solely by a transparent display screen such as an organic light emitting diode (OLED) display screen. However, for the purposes of brevity and clarity, examples of video presentation systems will be used that project images onto and through a display screen.

A discussion regarding embodiments of video presentation systems is provided below. First, the discussion will describe the structure or components of various embodiments of video presentation systems. Then the discussion will describe the operational description of the video presentation systems.

Figure 1:
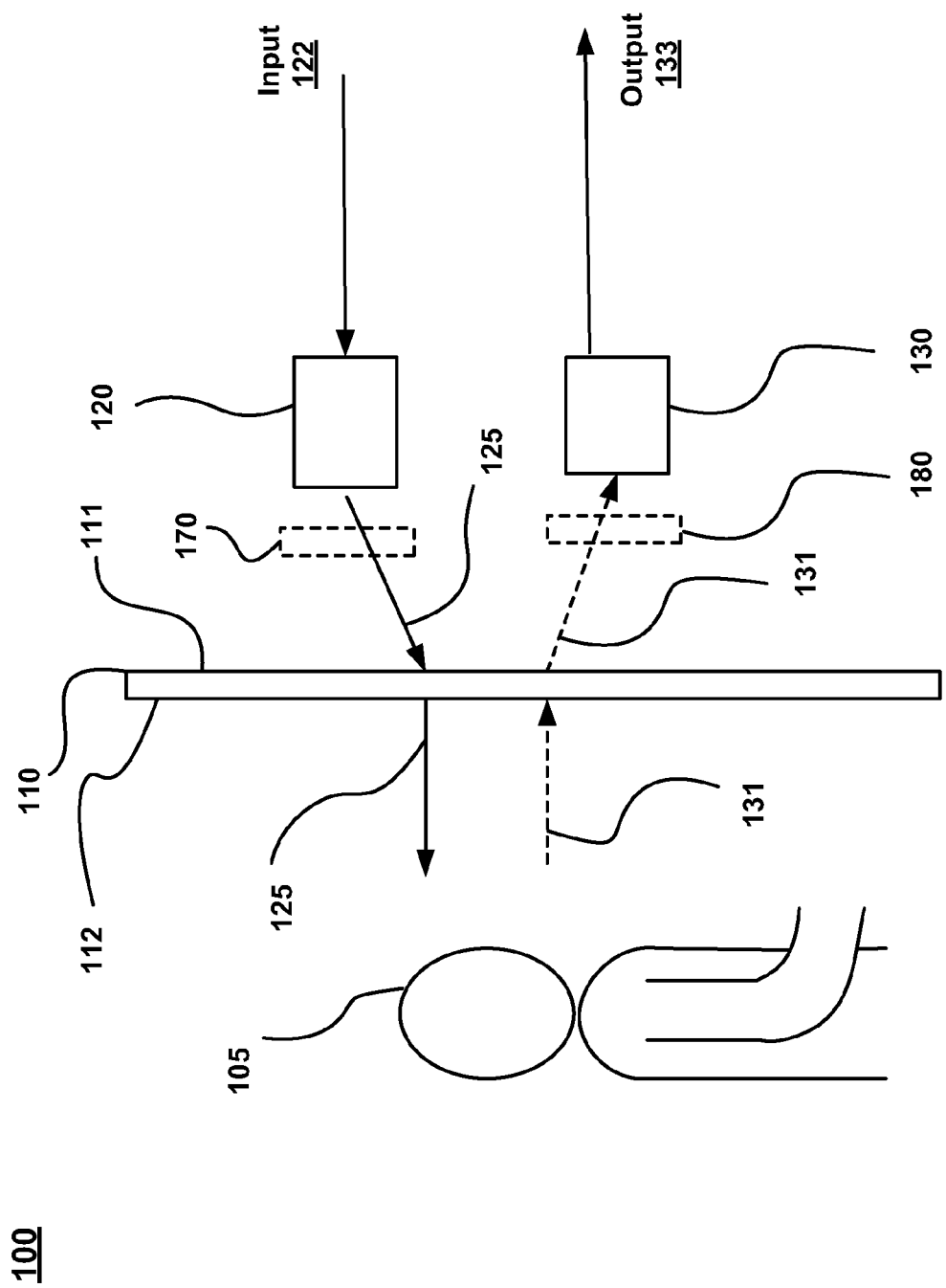

FIG. 1 depicts an embodiment of video presentation system 100 at a first location, in accordance to an embodiment of the present invention. Video presentation system 100 includes a first display screen 110, projector 120 and first camera 130. For purposes of brevity and clarity, a second display screen (at a second location) for viewing by an audience is not depicted.

In one embodiment, a second location can be a remote location, for example, a different city. In another embodiment, a second location can be a location in proximity to the first location. For example, first display screen 110 can be at one location on a stage of an auditorium and the second location is at another location on the stage. In another example, first display screen 110 is one room in a building and the second display screen is at another room in the same building or an adjacent building.

Projector 120 is configured to project images, via projected light 125 onto first display screen 110. In one embodiment, input 122 is streaming video data (that may also contain audio data) from a second location received by projector 120 and subsequently projected through projector 120 as images onto first display screen 110. In another embodiment, input 122 is shared media (e.g., PowerPoint slides) that are concurrently displayed on first display screen 110 (viewed by presenter 105) and a second display screen (viewed by an audience). It should be appreciated that presenter 105 is a user of video presentation system 100.

First camera 130 is configured to capture light 131 at the first location. The captured light is generated into capture images (e.g., output 133) for subsequent transmission to another location(s). First camera 130 may also include a microphone for capturing audio. Accordingly, output 133 includes audio data.

In one embodiment, first camera 130 captures images of non-verbal communication of presenter 105 corresponding to shared media displayed on first display screen 110. Non-verbal communication of presenter 105 can be, but is not limited to, handwriting, pointing, touching, facial expressions, hand movements, focused attention, gaze, posture and the like.

In another embodiment, first camera 130 is further configured to capture light from a light source (e.g., a laser pointer) to facilitate in capturing non-verbal communication of presenter 105. For example, if presenter 105 points at a graph displayed on a presentation slide, first camera 130 is able to determine where the laser beam from the laser pointer is hitting first display screen 110. Moreover, it is not a requirement for physical contact on first display screen 110 by presenter 105 to generate gestures such as handwriting.

First display screen 110 is configured to display images. For example, images captured at a second location and/or shared media. In one embodiment, display screen 110 is a rear projection display screen comprising a holographic screen material that diffuses light striking a surface from specific angles corresponding to the projector direction.

In another embodiment, display screen 110 is a transparent OLED display screen. In such an embodiment, video presentation system 100 does not require projector 120.

In various embodiments, video presentation system 100 employs optics and/or hardware to separate and remove cross-talk signals (e.g., backscattered light of projected light 125. For example, video presentation system 100 employs, but is not limited to, (1) time multiplexing, (2) polarization and (3) wavelength division multiplexing. In the various embodiments described this results in camera 130 capturing an image of presenter 105, but not of the images displayed on display screen 110.

In one embodiment, video presentation system 100 includes orthogonal polarizing filters 170 and 180 to reduce video cross-talk. For example, filter 170 filters out horizontally propagating light and filter 180 filters out vertically propagating light, or vice versa. As a result, video cross-talk is reduced.

In one embodiment, video presentation system 100 includes a touch sensing system. The touch sensing system is configured to sense the physical touch by presenter 105. For example, if pressure is applied to first display screen 110, by presenter 105 touching the screen at point x, the IR light is "frustrated" in the region of point x and the frustrated IR light is emitted outside of first display screen 110 in the region of point x. A touch camera (not shown) captures the frustrated IR light and, accordingly, senses the region of contact x.

In another embodiment, touch sensing system includes a pressure sensitive film (not shown) that is applied to surface 112 of first display screen 110. If pressure is applied to first display screen 110 at point x then a touch at point x is registered by the pressure sensitive film. In various embodiments, the physical touch of presenter 105 can be sketching, pointing, handwriting and the like.

It should be appreciated that video presentation system 100 can include any touch system (including the touch systems described above) that is able to sense touch by presenter 105. For example, video presentation system can also include a resistive touch system or a capacitive touch system.

FIG. 2 depicts video manipulator 240, in accordance to an embodiment of the present invention. Video manipulator 240 is configured to manipulate and combine video input 202 and shared media 204. Video manipulator 240 includes video accessor 210, shared media accessor 215, content analyzer 220 and video compositor 230.

Video accessor 210 is configured to access video input 202. In one embodiment, video input 202 is output 133 of first camera 130. In another embodiment, video input 202 is output of a second camera associated with a second display screen, which will be described in detail below. This accessing can comprise passively receiving video input 202 or actively pulling or polling for video input 202.

Shared media accessor 215 is configured to access shared media 204. Shared media 204 can be, but is not limited to, PowerPoint slides, Keynote slides, video content, etc. This accessing can comprise passively receiving shared media 204 or actively pulling or polling for shared media 204.

Content analyzer 220 is configured to generate alpha values. In one embodiment, the generated alpha values are per-pixel alpha values. In another embodiment, the generated alpha values are single alpha values. In various embodiments, content analyzer 220 utilizes alpha blending or any Porter-Duff operations.

Video compositor 230 is configured to generate composed video 250 based on video input 202 and shared media 204. For example, composed video 250 is video input 202 overlaid with shared media 204 or vice versa. Video compositor 230 can perform dynamic repositioning and blending of the various streams. Moreover, video compositor 230 may also perform a static geometric transform of the video input to align the video of the presenter with the shared media (e.g. remove barrel distortion due to a wide-angle camera lens). Also, video compositor 230 mirrors the video of the presenter left to right so that their image aligns with the shared content presented to the audience.

In embodiments in accordance with the present invention, shared media 204 is optionally composited with video from first camera 130 for display on second display screen 360.

In one embodiment, video compositor 230 utilizes rules in an RGBA representation where A represents an alpha channel with space and time varying alpha values $\alpha(x, y, t)$ with x and y spatial pixel coordinates, and time t.

In another embodiment, video compositor 230 utilizes a global value of $\alpha(x, y, t)$ (e.g., $\alpha=\frac{1}{2}$). However, in such an embodiment, the global value may vary based on what is displayed/detected.

The $\alpha(x, y, t)$ values are tailored to preserve the contrast of the presentation information, by analyzing the shared media colors for slide presentations and preserving the lighter colors by setting $\alpha=\max(R, G, B)$, where $\alpha$ represents the weight of the shared media.

In addition various image processing operations, such as desaturation and blur can be applied to the video of the speaker or shared media in order to deemphasize one with respect to the other.

A variety of effects can be achieved by content analysis, including computer vision and image analysis techniques. In one embodiment, slide transitions are detected. Dissolves that start by fully presenting the slides and fading into an adaptive alpha blend highlight the information in the slides at each transition, focusing on the viewer's attention.

In another embodiment, audio and video detection of the presenter is used to modify the alpha values to emphasize the speaker or emphasize the shared media. This can be dependent on the presenter's gestures or motions.

In a further embodiment, activity detection and spatial analysis of the shared media may be used to classify the shared media as slide presentation or video. Different compositing treatment can be used for each class of shared material.

In another embodiment, the size of the shared media may be automatically adjusted based on content analysis of the spatial frequencies in the shared media frames. For example, small font size media may be enlarged for better visibility.

In one embodiment, depth based cameras may be used to blend presenter information when gestures are near the screen, emphasizing the gestures instead of the full presenter video.

In various embodiments, the compositing operation may be overridden or be fully under interactive control of the presenter, the receiving audience or a professional A/V technician. System modification is not required to allow control by the presenter or local A/V technician. However, providing control to the receiving audiences may require modifying the system to transmit separately the two video streams and conduct the compositing at the receiving processor.

FIGS. 3A-F depict various embodiments of video presentation systems. The discussion below describes the operational description of the various embodiments of the video presentation systems.

FIG. 3A depicts video presentation system 300A, in accordance to an embodiment of the present invention. System 300A includes first display screen 110, projector 120 (not shown), first camera 130 (not shown) and second display screen 360. In one embodiment, second display screen 360 is in a remote location. In another embodiment, second display screen 360 is in a location in proximity to first display screen 110.

Second display screen 360 can be any display screen that is able to display video content. In one embodiment, a second projector (not shown) projects images onto second display screen. In another embodiment, second display screen 360 is a display screen similar to first display screen 110. For example, second display screen 360 can be a see-through display screen or a non see-through display screen. In a further embodiment, second display screen is a television.

Second display screen 360 is any size such that an audience viewing second display screen 360 is able to easily view shared media 204 and displayed non-verbal communication of presenter 105. First display screen 110 and second display screen 360 can be oriented in any position with respect to each such that audience 350A is able to view second display screen 360 and user 105 is able to interact with first display screen 110. In one embodiment, first display screen 110 is perpendicular to second display screen 360.

During use and operation of video presentation system 300A, presenter 105 presents shared media 204 (e.g., PowerPoint slide) to audience 350A. Shared media 204 is displayed on first display screen 110 (via projector 120 behind first display screen 110) and second display screen 360.

As presenter 105 faces first display screen 110 to interact with shared media 204 in close range, first camera 130 (behind first display screen 110) captures eye gaze and gestures in association to shared media 204. For example, when presenter 105 smiles while looking at and pointing at box 315 of shared media 204, first camera 130 captures images 305A of the smile, eye gaze and pointing of presenter 105 with respect to shared media 204.

Video manipulator 240 generates composed video 250 based on video input 202 (output 133 of first camera 130) and shared media 204. Composed video 250 is displayed on second display screen 360. Composed video 250 includes captured images 305A of the eye gaze and gestures overlaid with shared media 204. In other words, captured images 305A are superimposed or overlaid on shared media 204.

In one embodiment, if shared media 204 is not accessed or is not desired to be displayed on second display screen 360, video manipulator 240 outputs accessed video input 202 that is displayed on second display screen 360. In contrast, if video input 202 is not accessed or is not desired to be displayed on second display screen 360, video manipulator 240 outputs accessed shared media 204 that is displayed on second display screen 360.

As a result, audience 350A is able to view shared media 204 and eye gaze and gestures of presenter 105 associated with shared media 204 on second display screen 360 while presenter's 105 back is turned to audience 350A. Thus, presenter 105 is able to communicate more naturally with respect to shared media 204 to audience 350A.

Figure 3B:
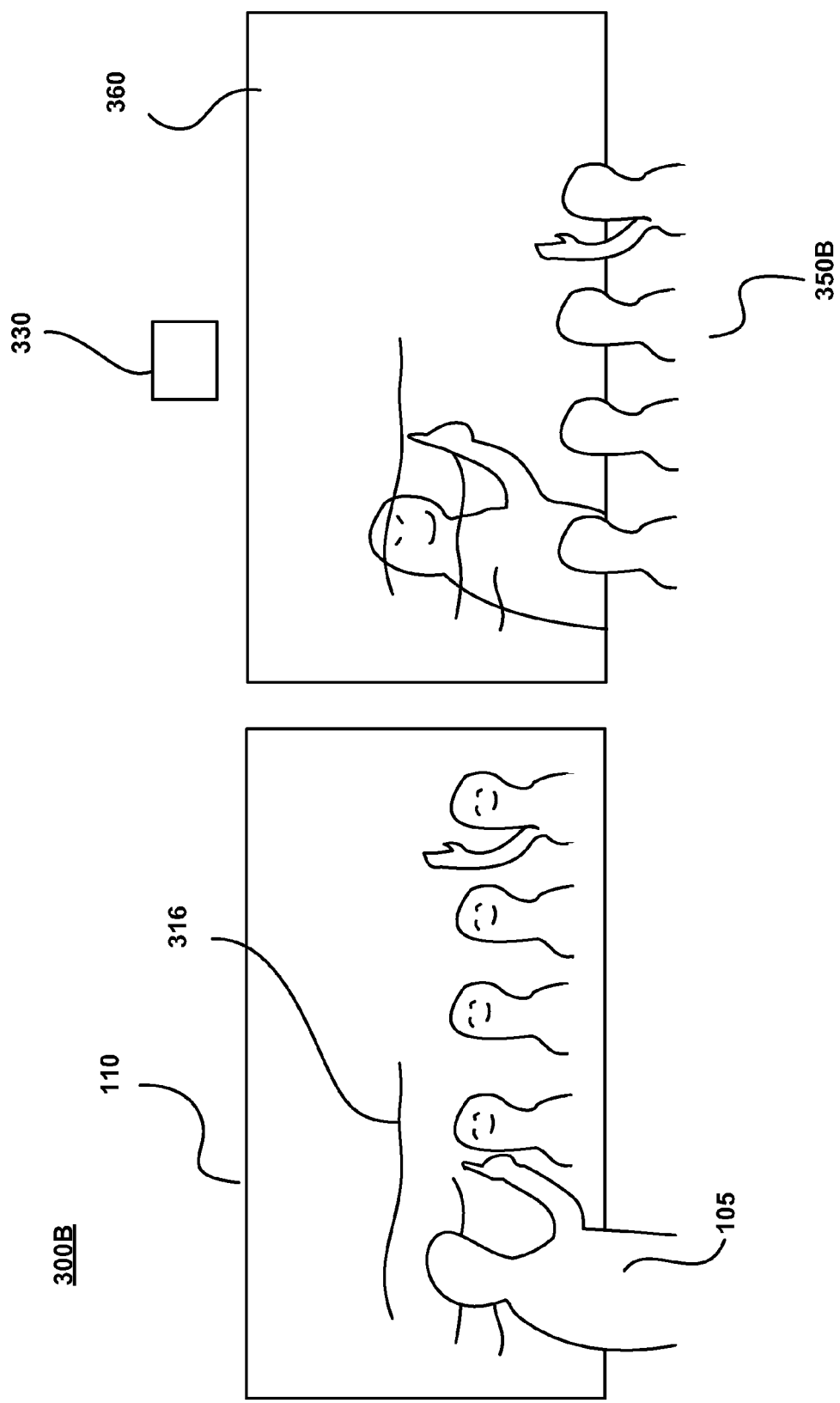

FIG. 3B depicts video presentation system 300B, in accordance to an embodiment of the present invention. Video presentation system 300B is similar to video presentation system 300A, however, video presentation system 300B also includes second camera 330.

Second camera 330 is configured to capture images of audience viewing second display screen 360. Second camera 330 is depicted being above second display screen 360. However, second camera 330 can be located in any position such that second camera 330 is able to capture images of audience 350B. For example, second camera 330 can be located behind second display screen 360 and capture images through second display screen 360.

Use and operation of video presentation system 300B is the same as the use and operation of video presentation system 300A, as described above. For example, audience 350B is able to view shared media 204 (not shown) and eye gaze and gestures of presenter 105 associated with shared media 204 on second display screen 360 while presenter's 105 back is turned to audience 350B. In particular, audience 350B is able to view eye gaze and handwriting 316 of presenter 105 associated with shared media 204 (not shown) on second display screen 360 while presenter's 105 back is turned to audience 350B.

Moreover, second camera 330 captures images of audience 350B. For example, second camera 330 captures the audience's reaction to presenter's 105 presentation.

Video manipulator 240 generates composed video 250 based on video input 202 (output of second camera 330) and shared media 204. Composed video 250 is displayed on first display screen 110. Composed video 250 (displayed on first display screen 110) includes captured images of camera 330 overlaid with shared media 204. Composed video 250 (displayed on second display screen) includes and presenter's 105 gestures (e.g., handwriting) associated with shared media 204.

In one embodiment, video manipulator 240 is utilized for generating composed video for display on first display screen 110 and second display screen 360. In another embodiment, a first video manipulator is utilized for generating composed video for display on first display screen 110 and a second video manipulator is utilized for generating composed video for display on second display screen.

As a result, presenter 105 is able to view audience 350B while presenter's 105 back is turned to audience 350B. Thus, presenter 105 is able to communicate more naturally with audience 350B and audience 350B is able to communicate more naturally with presenter 105.

Figure 3C:
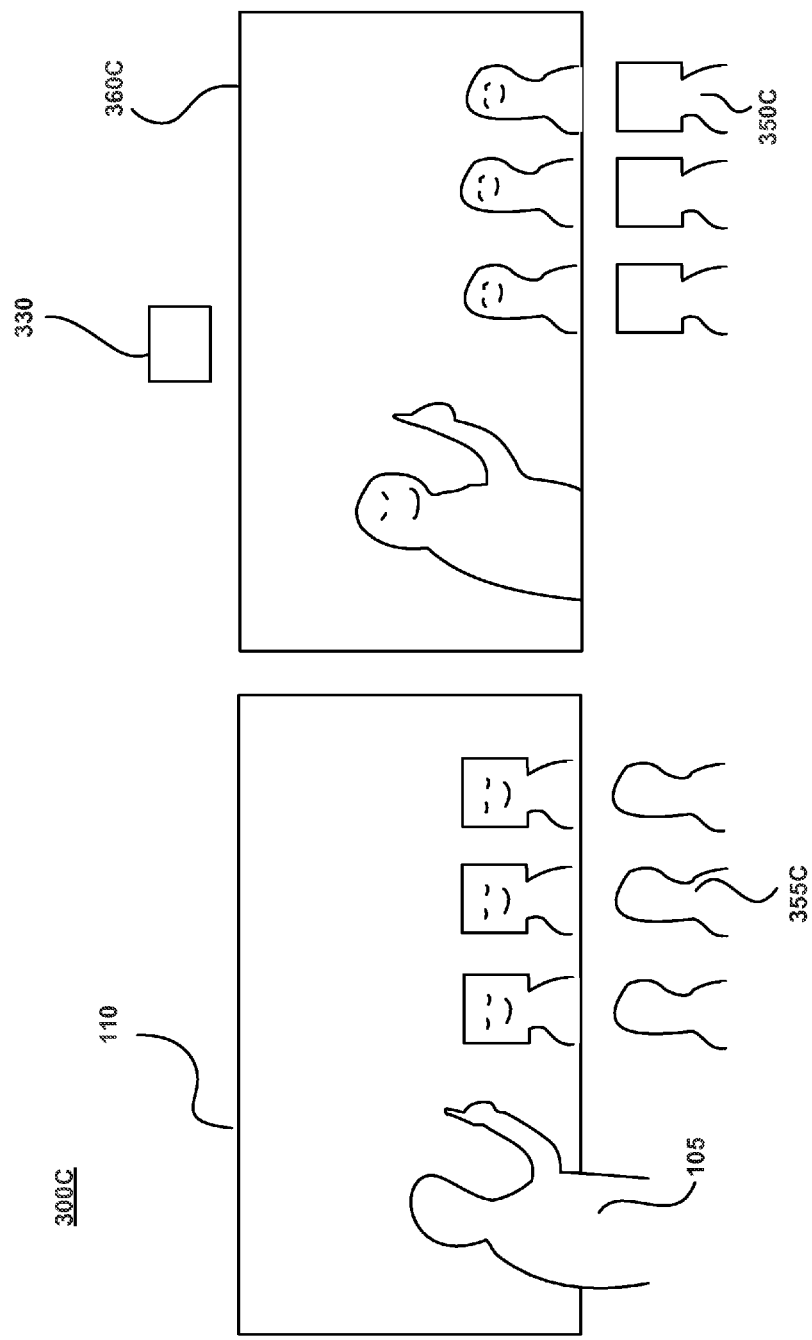

FIG. 3C depicts video presentation system 300C, in accordance to an embodiment of the present invention. Video presentation system 300C is similar to video presentation system 300B, however, video presentation system 300C includes second display screen 360C at a remote location with respect to first display screen 110.

Use and operation of video presentation system 300C is similar to the use and operation of video presentation system 300B, as described above. For example, camera 330 captures images of audience 350C and presenter 105 is able to view audience 350C on first display screen 110.

However, first camera 130 captures images of audience 355C viewing presenter 105 at first display screen 110. For example, first camera 130 captures the audience's 355 reaction to presenter's 105 presentation.

Moreover, first camera 130 includes a broad viewing range. In particular, first camera 130 is able to capture images in a viewing range laterally beyond the periphery of first display screen 110. For example, presenter 105 can interact with shared media (e.g., slides), move to either side of first display screen 110 to get a clear view of audience 355C, walk back to first display screen 110 to interact with shared media, all the while remaining in the view of first camera 130.

Video manipulator 240 generates composed video 250 based on video input 202 (output 133 of camera 130) and shared media 204 (not shown). Composed video 250 is displayed on second display screen 360. Composed video 250 includes captured images of camera 130 overlaid with shared media 204 and presenter's 105 gestures (not shown) associated with shared media 204.

As a result, presenter 105 and audience 355C are able to view audience 350C (at a remote location) on first display screen 110. Likewise, audience 350C is able to view audience 355C and presenter 105 on second display screen 360. Thus, presenter 105 is able to communicate more naturally with audience 350C and audience 350B is able to communicate more naturally with presenter 105.

Figure 3D:
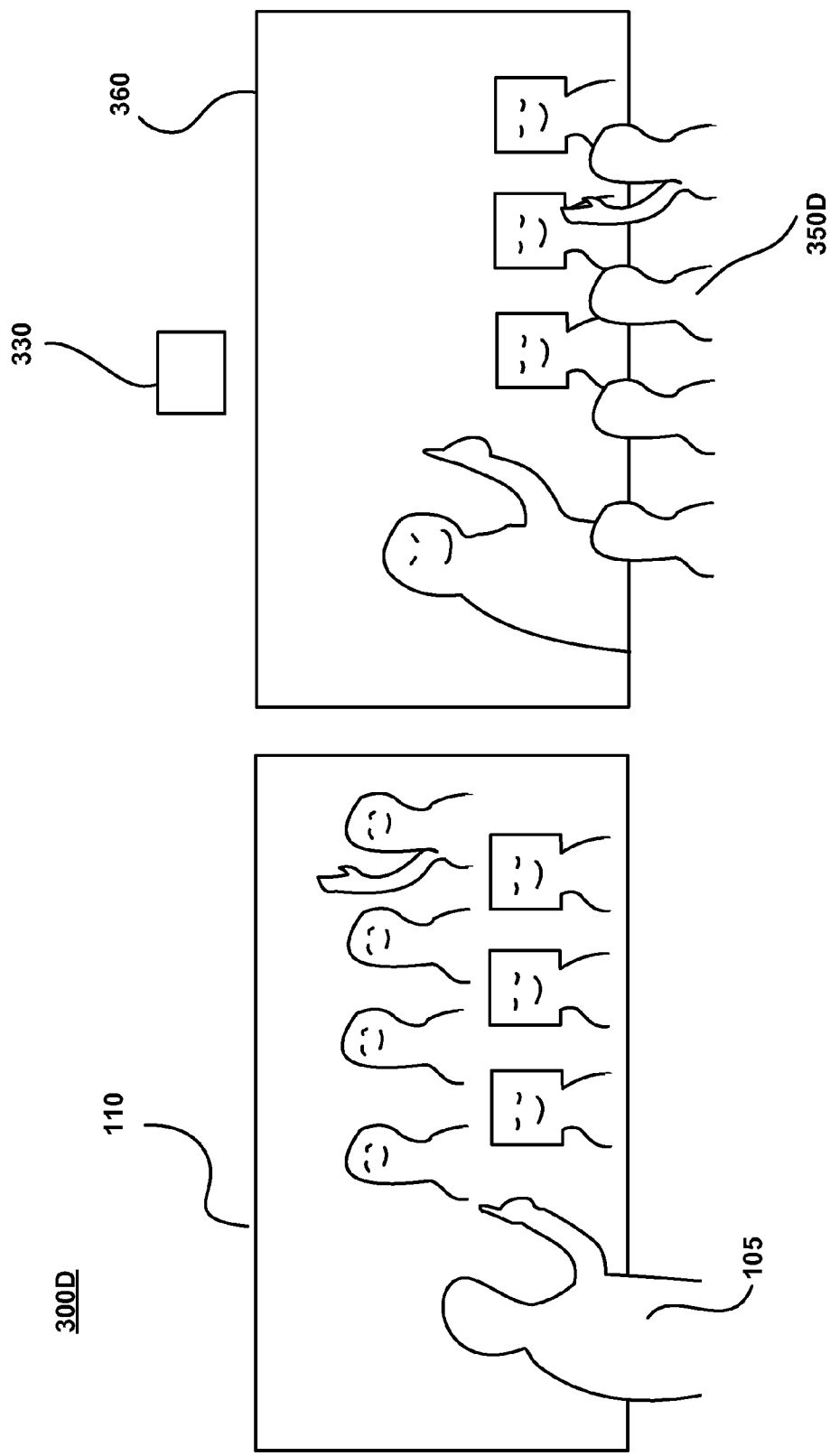

FIG. 3D depicts video presentation system 300D, in accordance to an embodiment of the present invention. Video presentation system 300D is similar to video presentation system 300C, however, video presentation system 300D includes views of audiences from multiple remote sites combined and displayed together.

Use and operation of video presentation system 300D is similar to the use and operation of video presentation system 300C, as described above. For example, second camera 330 captures images of audience 350D and presenter 105 is able to view audience 350D on first display screen 110.

However, first display screen 110 displays audience 350D and other audiences at other remote locations. Additionally, second display screen 360 also displays the other audiences at the other remote locations.

As a result, presenter 105 is able to view audience 350D (at a remote location) and other audiences (at other remote locations) on first display screen 110. Likewise, audience 350D is able to view presenter's 105 non-verbal communication and the other audiences (at other remote locations) on second display screen 360. Thus, views of audiences are combined for presenter 105 and each local audience sees presenter 105 and combined view(s) of remote audience(s).

Figure 3E:
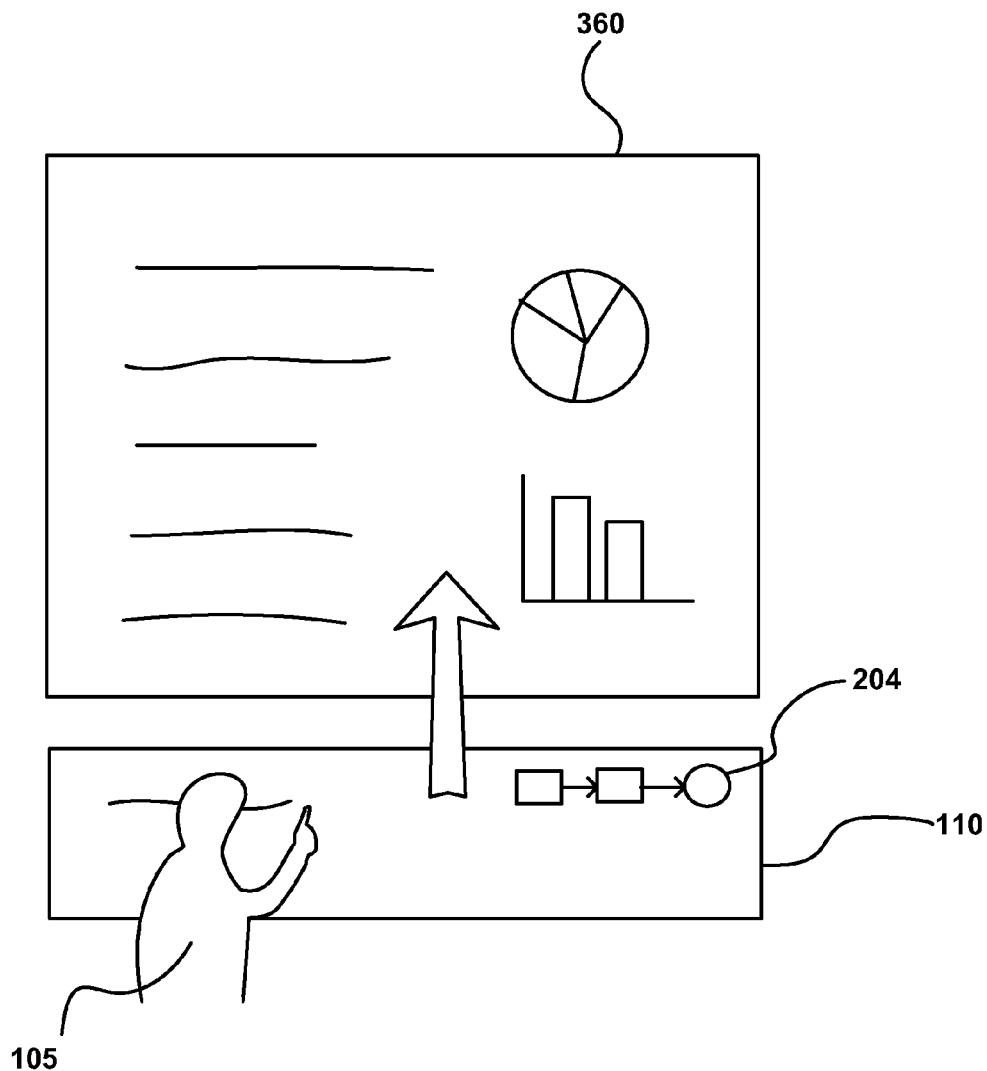

FIG. 3E depicts video presentation system 300E, in accordance to an embodiment of the present invention.

Video presentation system 300E includes first display screen 110 and second display screen 360. First display screen 110 and second display screen 360 are spatially coherent. For example, shared media 204 displayed on first display screen 110 and/or gestures (e.g., handwriting) associated with shared media 204 that are generated by presenter 105 on display screen 110 can be scrolled to second display screen 360. In other words, presenter 105 is able to create and interact with graphical content and scroll the content onto second display screen 360.

As a result, first display screen 110 and second display screen 360 form a continuous scrolling canvas on which presenter 105 can create and scroll/translate/zoom graphical content. Moreover, an audience (not shown) is able to view the content on second display screen 360.

It should be appreciated that second display screen 360 can be located in any position (e.g., right side, left side) that allows for spatial coherence between first display screen 110 and second display screen 360.

Figure 3F:
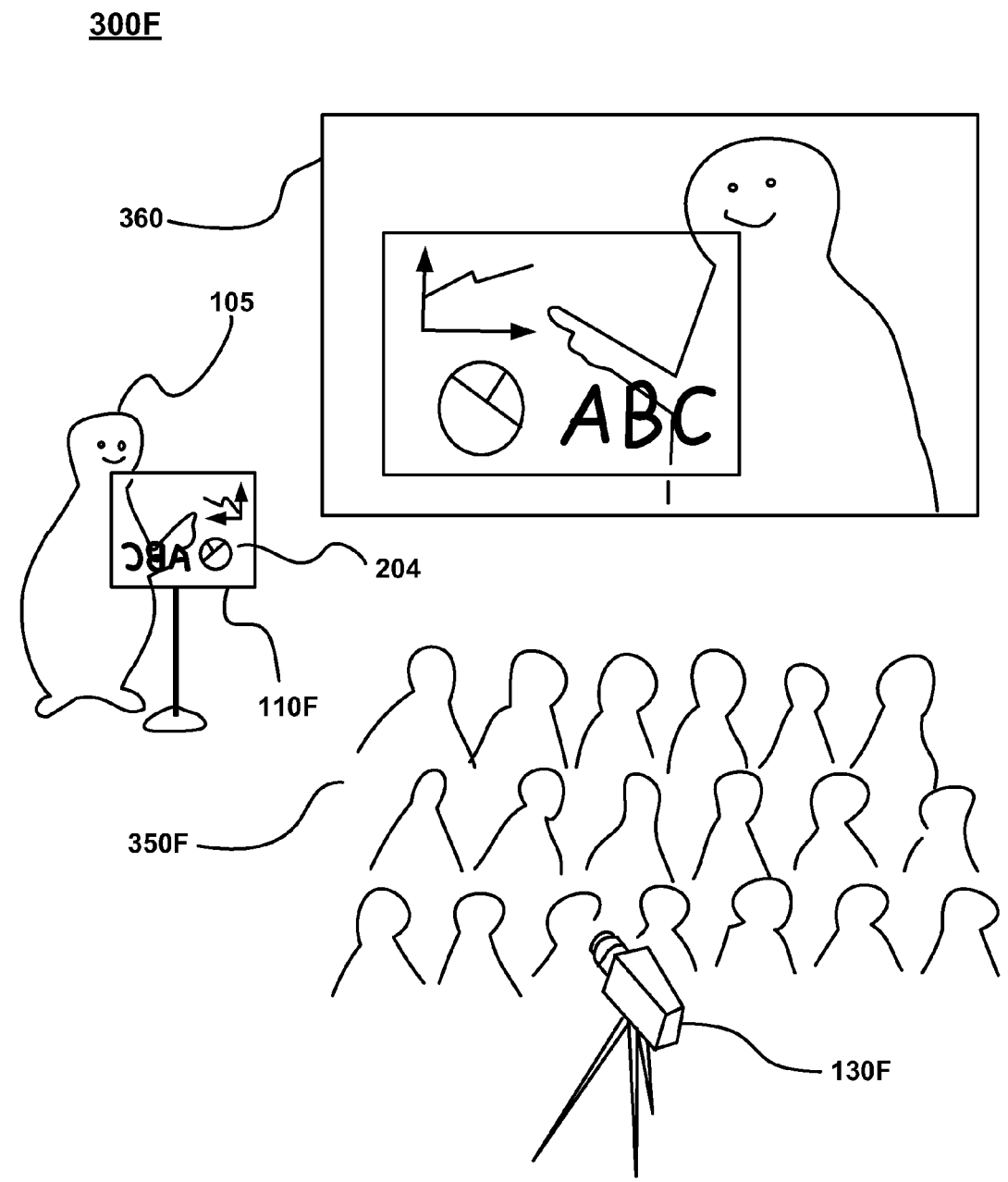

FIG. 3F depicts video presentation system 300F, in accordance to an embodiment of the present invention. Video presentation system 300F is similar to the previously described video presentation systems. However, presenter 105 is able to face audience 350F when interacting with shared media 204. In particular, first display screen 110F is a transparent display screen that is utilized as part of a podium. In various embodiments, video presentation system 300F may or many not include second camera 330 (not shown).

During use and operation of video presentation system 300F, a field of view of first camera 130F is oriented such that images captured by first camera 130F comprise non-verbal communication of a presenter 105 associated with shared media 204. For example, first camera 130F is located at a position that allows for first camera 130F to capture images of presenter 105 smiling while pointing at shared media 104.

Moreover, the field of view of first camera 130F can be very broad. For example, first camera 130F is able to capture images of presenter 105 interacting with shared media 204 on first display screen 110F, moving to either side of first display screen 110F to get a clear view of audience 350F, walking back to first display screen 110F to interact with shared media 204, all the while remaining in the view of first camera 130F. In other words, first camera 130F is able to capture images of presenter 105 facing audience 350F and while presenter 105 is behind (or partially behind), beside, first display screen 110F. Additionally, first camera 130F is able to capture images of presenter 105 holding up an object (e.g., document). In one embodiment, first camera 130F captures (1) non-verbal communication associated with shared media 204 displayed on first display screen 110F and (2) the shared media 204 displayed on first display screen 110F.

Video manipulator 240 generates composed video 250 based on video input 202 and shared media 204. Composed video 250 is displayed on second display screen 360. Composed video 250 includes captured images of first camera 130F overlaid with shared media 204 and presenter's 105 non-verbal communication associated with shared media 204.

As a result, audience 350F is able to view presenter's 105 non-verbal communication associated with shared media 204 (which is flipped horizontally). Thus, presenter 105 is able to communicate more naturally with audience 350F.

Figure 4:
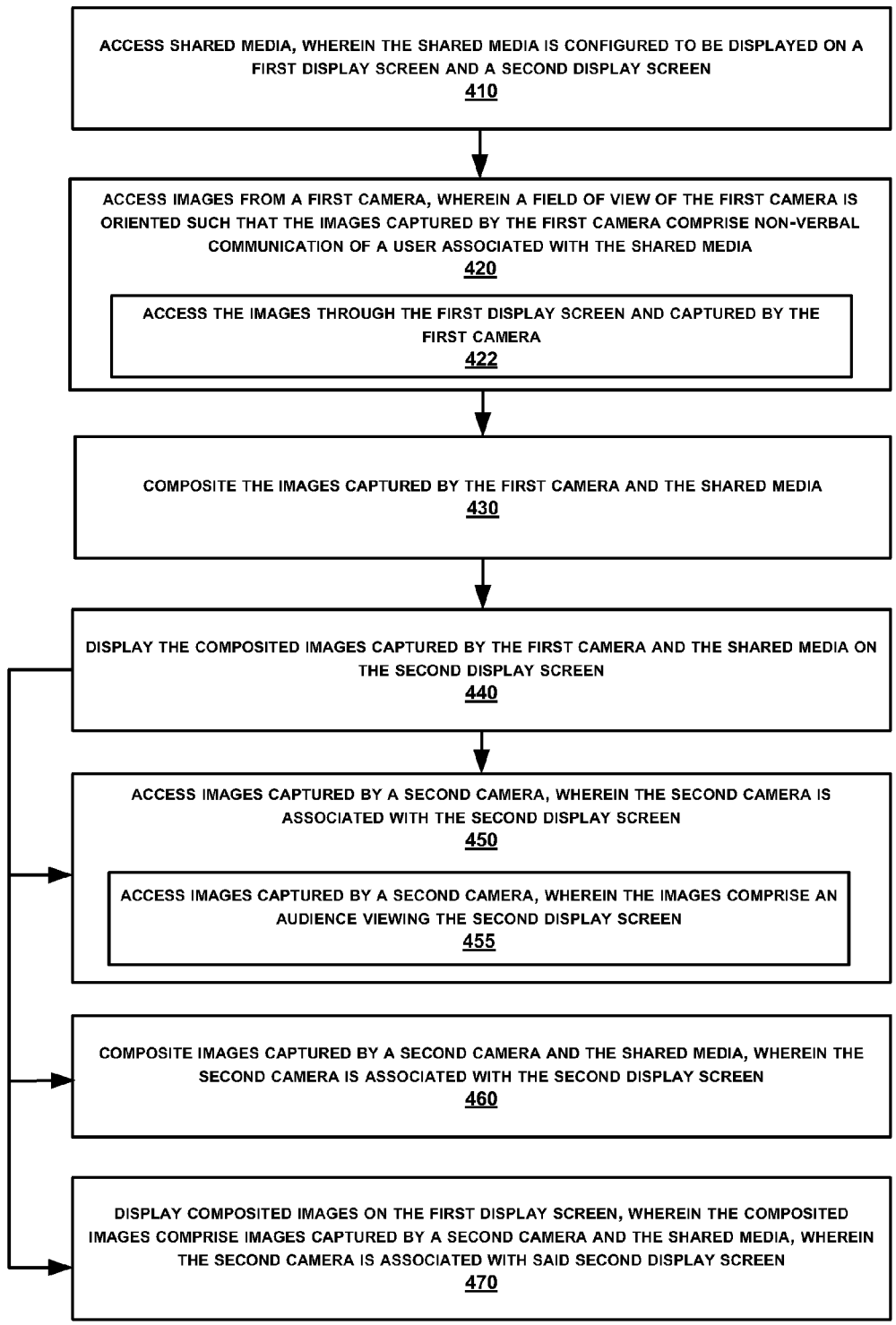
FIG. 4 illustrates an example of a flow chart of a method for enhancing visual presentations, in accordance with an embodiment of the present invention.

FIG. 4 depicts a method 400 for enhancing visual presentations, in accordance with an embodiment of the present invention. In one embodiment, method 400 is carried out by processors and electrical components under the control of computer readable and computer executable instructions. The computer readable and computer executable instructions reside, for example, in a data storage medium such as computer usable volatile and non-volatile memory. However, the computer readable and computer executable instructions may reside in any type of computer readable storage medium. In some embodiments, method 400 is performed at least by video presentation systems described in FIGS. 1-3F.

At 410 of method 400, shared media 204 is accessed. In one embodiment, shared media 204 is configured to be displayed on a first display screen 110 and a second display screen 360.

At 420 of method 400, images from a first camera 130 are accessed. A field of view of first camera 130 is oriented such that images captured by first camera 130 comprise non-verbal communication of a user associated with shared media 204.

In one embodiment, at 422 of method 400, the images are accessed through first display screen 110 and captured by the first camera 130.

At 430 of method 400, the images captured by first camera 130 and shared media 204 are composited.

At 440 of method 400, composited images captured by first camera 130 and shared media 204 are displayed on second display screen 360.

At 450 of method 400, images captured by second camera 330 are accessed. Second camera 330 is associated with second display screen 360. In one embodiment, at 455 of method 400, wherein the images comprise an audience viewing second display screen 360.

At 460 of method 400, images captured by second camera 330 and shared media 204 are composited. The second camera is associated with second display screen 360.

At 470 of method 400, composited images are displayed on first display screen 110. The composited images comprise images captured by second camera 330 and shared media 204. Second camera 330 is associated with second display screen 360.

Various embodiments of the present invention are thus described. While the present invention has been described in particular embodiments, it should be appreciated that the present invention should not be construed as limited by such embodiments, but rather construed according to the following claims.

The invention claimed is:

1. A non-transitory computer useable storage medium having computer readable program code embedded therein for a video presentation system executing in a computer system, comprising:
a shared media accessor configured to access shared media, wherein said shared media is displayed on a first display screen and on a second display screen;
a video accessor configured to access images captured by a first camera, wherein a field of view of said first camera is oriented such that said images captured by said first camera comprise at least one person associated with said shared media and non-verbal communication thereof and configured to access images captured by a second camera, wherein a field of view of said second camera is oriented such that said images captured by said second camera comprise at least one person associated with said shared media and non-verbal communication thereof, wherein said at least one erson comprises at least one of a presenter and an audience; and
a video compositor configured to composite said images captured by said first camera and said shared media to achieve first composited images, wherein said first composited images are displayed on said second display screen and configured to composite said images captured by said second camera and said shared media to achieve second composited images, wherein said second composited images are displayed on said first display screen, wherein a surface of said first display screen that displays said second composited images is facing at least said presenter in the same direction as said first camera faces, and wherein a surface of said second display screen that displays said first composited images is facing at least said audience in the same direction as said second camera faces.

2. The non-transitory computer useable storage medium of claim 1, wherein said first display screen is a see-through display screen.

3. The non-transitory computer useable storage medium of claim 1, comprising:
a content analyzer configured to generate per pixel alpha values.

4. A method for enhancing visual presentations, said method comprising:
accessing shared media, wherein said shared media is displayed on a first display screen and a second display screen;
accessing images captured by a first camera, wherein a field of view of said first camera is oriented such that said images captured by said first camera comprise at least one person associated with said shared media and non-verbal communication thereof and configured to access images captured by a second camera, wherein a field of view of said second camera is oriented such that said images captured by said second camera comprise at least one person associated with said shared media and non-verbal communication thereof, wherein said at least one person comprises at least one of a presenter and an audience;
compositing said images captured by said first camera and said shared media to achieve first composited images;
compositing said images captured by said second camera and said shared media to achieve second composited images;
displaying said first composited images on said second display screen, wherein a surface of said second display screen that displays said first composited images is facing at least said audience in the same direction as said second camera faces; and
displaying said second composited images on said first display screen, wherein a surface of said first display screen that displays said second composited images is facing at least said presenter in the same direction as said first camera faces.

5. The method of claim 4, wherein said accessing images comprises:
accessing said images through said first display screen and captured by said first camera.

6. The method of claim 4, wherein said non-verbal communication associated with said shared media are a group of gestures consisting of:
hand-writing, pointing, touching, facial expressions, hand movements and focused attention.

7. The method of claim 4, wherein said captured images from said first camera comprises:
captured images from a viewing range that laterally extends beyond a periphery of said first display screen.

* * * * *

UNITED STATES PATENT AND TRADEMARK OFFICE
CERTIFICATE OF CORRECTION

| | |
|---|---|
| PATENT NO. | : 8,996,974 B2 |
| APPLICATION NO. | : 12/897393 |
| DATED | : March 31, 2015 |
| INVENTOR(S) | : Kar-Han Tan et al. |

It is certified that error appears in the above-identified patent and that said Letters Patent is hereby corrected as shown below:

In the Claims

In column 9, line 37 approx., in Claim 1, delete "erson" and insert -- person --, therefor.

Signed and Sealed this
Seventh Day of July, 2015

Michelle K. Lee
*Director of the United States Patent and Trademark Office*